United States Patent
Terajima

(10) Patent No.: US 6,342,949 B1
(45) Date of Patent: *Jan. 29, 2002

(54) IMAGE FORMING APPARATUS THAT PREVENTS RECORDING IN AN UNDESIRED IMAGE FORMATION MODE

(75) Inventor: Hisao Terajima, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/182,005

(22) Filed: Oct. 29, 1998

Related U.S. Application Data

(62) Division of application No. 08/927,802, filed on Sep. 11, 1997, now Pat. No. 5,844,690, which is a continuation of application No. 08/181,061, filed on Jan. 14, 1994, now abandoned.

(30) Foreign Application Priority Data

Jan. 29, 1993 (JP) .............................. 5-013877

(51) Int. Cl.⁷ .............................. B41B 1/00; B41F 1/00; B41J 1/00; G06F 15/00; G06K 1/00
(52) U.S. Cl. ..................................... 358/1.13; 358/1.14
(58) Field of Search ............................ 358/1.12, 1.13, 358/1.15, 400, 407, 425, 439, 442, 443, 448, 296; 347/2, 3, 40, 47, 51, 56; 399/1, 2, 31, 46, 82, 87

(56) References Cited

U.S. PATENT DOCUMENTS

| | | | |
|---|---|---|---|
| 4,313,124 A | 1/1982 | Hara | 347/57 |
| 4,345,262 A | 8/1982 | Shirato et al. | 347/10 |
| 4,459,600 A | 7/1984 | Sato et al. | 347/56 |
| 4,463,359 A | 7/1984 | Ayata et al. | 347/56 |
| 4,558,333 A | 12/1985 | Sugitani et al. | 347/65 |
| 4,608,577 A | 8/1986 | Hori | 347/66 |
| 4,723,129 A | 2/1988 | Endo et al. | 347/56 |
| 4,740,796 A | 4/1988 | Endo et al. | 347/56 |

(List continued on next page.)

FOREIGN PATENT DOCUMENTS

| | | | |
|---|---|---|---|
| EP | 0-076948 | 4/1983 | ............ B41J/3/04 |
| JP | 5456847 | 5/1979 | |
| JP | 5-9123670 | 7/1984 | |
| JP | 5-9138461 | 8/1984 | |
| JP | 6071260 | 4/1985 | |

OTHER PUBLICATIONS

Patent Abstracts of Japan, vol. 9, No. 213 (M–408) Aug. 30, 1985 & JP–A–60 071 260 (Erumu K.K..) Apr. 23, 1985 [Abstract].

Patent Abstracts of Japan, vol. 15, No. 506 (E–1148) Dec. 20, 1991 & JP–A–03 220 855 (Brother INT) Sep. 30, 1991 [Abstract].

Patent Abstracts of Japan, vol. 16, No. 388 (M–1297) Aug. 18, 1992 & JP–A–04 128 064 (Koufu Nihon Denki KK) Apr. 28, 1992 [Abstract].

Patent Abstracts of Japan, vol. 17, No. 80 (M–1368) Feb. 17, 1993 & JP–A–04 279 367 (Hitachi Ltd.) Oct. 5, 1992 [Abstract].

*Primary Examiner*—Gabriel I. Garcia
(74) *Attorney, Agent, or Firm*—Fitzpatrick, Cella, Harper & Scinto

(57) ABSTRACT

An image forming apparatus for forming an image based on data received from a plurality of data sources of different kinds includes a receiver for receiving data from each of the plurality of data sources; a memory for storing data received by the receiver; a recording unit for forming an image based on data read from the memory; a determination unit for determining whether or not image formation by the recording unit is currently being performed; and an output unit for generating a command for setting the recording unit in a specific one of a plurality of printing modes.

10 Claims, 6 Drawing Sheets

U.S. PATENT DOCUMENTS

| | | | | |
|---|---|---|---|---|
| 4,947,345 A | * | 8/1990 | Paradise et al. | 358/442 |
| 5,228,118 A | * | 7/1993 | Sasaki | 358/1.13 |
| 5,266,996 A | * | 11/1993 | Wakamiya et al. | 399/4 |
| 5,469,373 A | * | 11/1995 | Kashiwazaki et al. | 702/127 |
| 5,805,297 A | * | 9/1998 | Furuya et al. | 358/400 |
| 5,815,280 A | * | 9/1998 | Ohmura et al. | 358/296 |
| 5,844,690 A | * | 12/1998 | Tevajima | 358/296 |
| 5,877,869 A | * | 3/1999 | Tachibana | 358/437 |

* cited by examiner

IMAGE FORMING APPARATUS THAT PREVENTS RECORDING IN AN UNDESIRED IMAGE FORMATION MODE

This application is a division of application Ser. No. 08/927,802 filed on Sep. 11, 1997, now U.S. Pat. No. 5,844,690, which is a continuation of Ser. No. 08/181,061 filed Jan. 14, 1994, now abandoned.

BACKGROUND OF THE INVENTION

1. Field of the Invention

The present invention relates to an image forming apparatus which functions as a printer for a computer or the like and as a facsimile apparatus.

2. Description of the Related Art

Thermal printers, LBPs (laser beam printers), etc. have been used as the recording sections of facsimile apparatuses. Thermal printers have a problem in that the recording paper used therein has rather poor properties in terms of imprinting and shelf life. LBPs have a problem in that they are rather large and costly. In view of these problems, a small, inexpensive printer has been developed whose recording section consists of an ink-jet type recording printer using ordinary paper.

Generally speaking, an ink-jet type printer has the following features:

It has a head in which several tens of ink discharge nozzles are arranged along a sub-scanning dimension at intervals according to the pixel pitch, and performs one band (line) of printing by ejecting ink while the head moves in a main scanning direction. It also moves the recording paper in the sub-scanning direction by a distance corresponding to one band. By repeating these operations, it forms one page of an image.

Printing is possible by both the forward and backward movements of the head. However, when an image extending over a plurality of bands is printed, an image misregistration between the bands may be caused for mechanical reasons. Such misregistration is more serious in reciprocative printing than in printing in the forward direction only (the one direction printing mode).

When printing an image output from a computer (bit image data), only the forward movement of the head is generally used for the printing in order to minimize such misregistration as mentioned above as much as possible.

Some ink-jet type printers have a draft mode which is used for draft printing (a printing mode for draft printing and temporary printing for checking the layout). This is a mode in which the pixels are thinned out in a zigzag fashion to economize ink and, at the same time, the head is moved at an increased speed for high-speed printing.

When employed as the printing section of a facsimile apparatus having a printer interface, such an ink-jet type printer is designed to be capable of being used in both draft mode printing and one direction printing. More specifically, printing mode setting keys are provided on the operation panel, enabling the user to select between the normal and draft modes by operating these keys. When output images from a computer (bit image data) are to be printed, only the forward movement of the head is used for printing in consideration of image quality.

However, in the above-described type of facsimile apparatus having a printer interface, it may happen that the apparatus performs a facsimile receiving operation after the user has set it to the draft mode. The received information will then be printed (recorded) in the draft mode, resulting in the received image being rather lightly printed or the finely printed portions being unintelligible.

Further, while output images from the computer can be adjusted to the printer capacity (e.g., 360 dpi), the resolution of received images of the facsimile apparatus is at a relatively low level of 8 dot/mm (203.2 dpi), so that the above-mentioned misregistration between the bands would not be so conspicuous if printing were effected through the reciprocative movement of the head. Despite this fact, it may happen that preference is given to the printing of computer output by selecting one direction printing, resulting in a reduction in printing speed. Since facsimile apparatuses of the ink-jet type are manufactured relatively inexpensively, their memory capacity is generally not very large. Thus, such a low printing speed is liable to lead to an overflow of received facsimile images.

SUMMARY OF THE INVENTION

It is accordingly an object of the present invention to provide an image forming apparatus in which the above-mentioned problems have been eliminated.

Another object of the present invention is to provide an image forming apparatus in which image data received in facsimile communications is prevented from being recorded in an undesired image formation mode.

Still another object of the present invention is to provide an image forming apparatus in which image data other than image data received in facsimile communications is prevented from being recorded in an undesired image formation mode.

To achieve the above objects, there is provided, in accordance with the present invention, an image forming apparatus of the type which has a plurality of image formation modes of different image qualities, wherein the image forming apparatus is equipped with: a recording section which can be used for image formation of both image data received in facsimile communications and other image data; and a switching means for switching between an image formation mode for recording image data received in facsimile communications and one for recording other image data.

Further, in accordance with the present invention, there is provided an image forming apparatus of the type which has a recording section that can be used for image formation of both image data received in facsimile communications and other image data, wherein recording of image data received in facsimile communications is possible even when the recording section is in a mode for image formation of other image data, the image forming apparatus being equipped with: a detection means for detecting that the recording section is performing image formation of image data other than image data received in facsimile communications; and a means for switching the recording section to a mode for image formation of image data received in facsimile communications so as to record such received image data when the detection means detects that the recording section is not operating in the mode for image formation of image data other than image data received in facsimile communications.

Still further, in accordance with the present invention, there is provided an image forming apparatus of the type which has a plurality of image formation modes of different image qualities and which has a recording section that can be used for image formation of both image data received in facsimile communications and other image data, wherein recording of image data received in facsimile communications is possible even when the recording section is in a mode for image formation of other image data, the image forming apparatus being equipped with: a detection means for detecting that the recording section is performing image formation of image data other than received image data in facsimile communications; and a switching means for switching the recording section to a mode for image formation of image data received in facsimile communications so as to record such received image data when the detection means detects that the recording section is not operating in the mode for image formation of other image data, the recording section being restored to the image formation mode for other image data after the completion of the recording of the image data received in facsimile communications.

In accordance with the present invention, the recording section has a plurality of image formation modes of different image qualities, whereby it is always possible to to perform image formation in an image formation mode that is most suitable for the matter to be printed.

In accordance with the present invention, there is provided an image forming apparatus of the type which has a facsimile function by which it records image data received in facsimile communications and a printer function by which it records image data output from a host computer. The image forming apparatus comprises:

setting means for setting the apparatus to one of a plurality of printing modes;
recording means for recording image data;
reception means for receiving facsimile image data; and
control means for causing the setting means to set the apparatus to a specific printing mode when facsimile image data received by the reception means is to be recorded, independent of any printing mode in which the apparatus has previously been set by the setting means.

In a preferred embodiment of the present invention, the plurality of printing modes include at least either a draft mode or a high-quality mode.

In another preferred embodiment of the present invention, the above-mentioned recording means includes: a recording head equipped with a plurality of recording elements; and a movement means for performing a main scanning through a reciprocating movement of the recording head relative to a recording medium. The above-mentioned high-quality mode is a one-direction recording mode in which a main scanning is performed by moving the recording head in one direction of the above-mentioned reciprocating movement, and the above-mentioned specific mode is a two-direction (normal) recording mode in which the main scanning is performed by moving the recording head in both directions of the reciprocating movement. By a manual operation conducted by an operator and/or in response to a call from a line, the apparatus is switched from a printing to a facsimile mode, and, in response to the setting of the facsimile mode, a specific printing mode is set.

Thus, printing in a printing mode that is most suitable for the operation mode of the recording means is possible. That is, when the apparatus is to be used as a printer (i.e., in the printer mode), the user can select between the normal and draft modes, and image data, etc. can be printed with high quality by moving the recording head in the forward direction only (one-direction printing). When in the facsimile mode, the apparatus is set to the normal mode, in which high-speed printing is possible through reciprocative printing. Even if the user leaves the apparatus in the printer mode, images received in facsimile communications are not printed by one-direction printing but in the normal mode (printing mode).

Further, in accordance with the present invention, image data received in facsimile communications and other image data can both be prevented from being recorded in an undesired image formation mode.

According to a preferred embodiment of the present invention, the recording section ejects ink droplets through discharge nozzles by utilizing an ejection energy generated in correspondence with the image data to be recorded, thereby recording images on a recording medium.

In another preferred embodiment of the present invention, the recording section causes changes in ink condition by utilizing heat energy, thereby ejecting ink droplets.

In still another preferred embodiment of the present invention, the above-mentioned recording section performs the main scanning by a reciprocating movement of the recording head, equipped with a plurality of recording elements, relative to the recording medium, and the above-mentioned plurality of image formation modes include a mode in which the main scanning is performed by moving the recording head in one direction of the reciprocating movement and a mode in which the main scanning is performed by moving the recording head in both directions of the reciprocating movement.

In a still further preferred embodiment of the present invention, the above-mentioned plurality of image formation modes include at least a mode in which image data is recorded in a thinned-out form.

Other objects, advantages and effects of the present invention will become more apparent from the following detailed description, the drawings and the claims.

DETAILED DESCRIPTION OF THE PREFERRED EMBODIMENTS

Embodiments of the present invention will now be described in detail with reference to the accompanying drawings.

Figure 1:
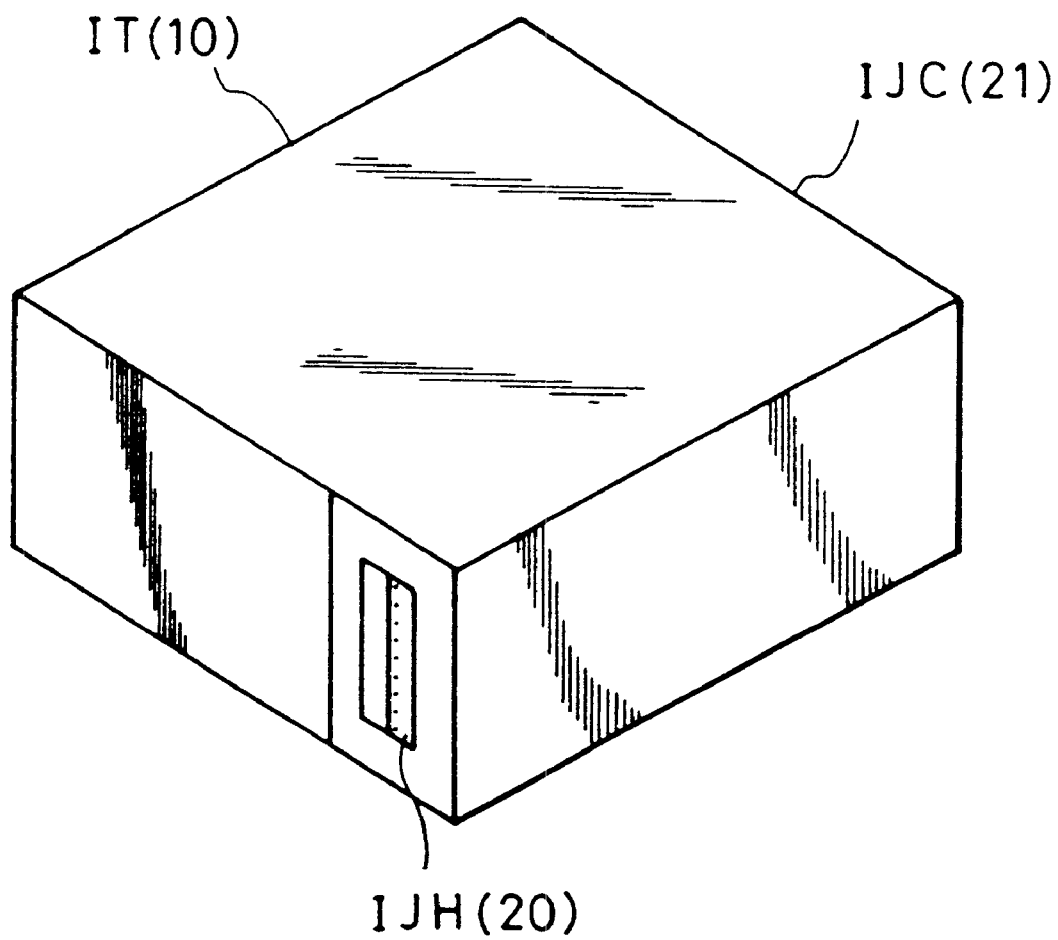
FIG. 1 is a perspective view showing an ink-jet cartridge.
Figure 2:
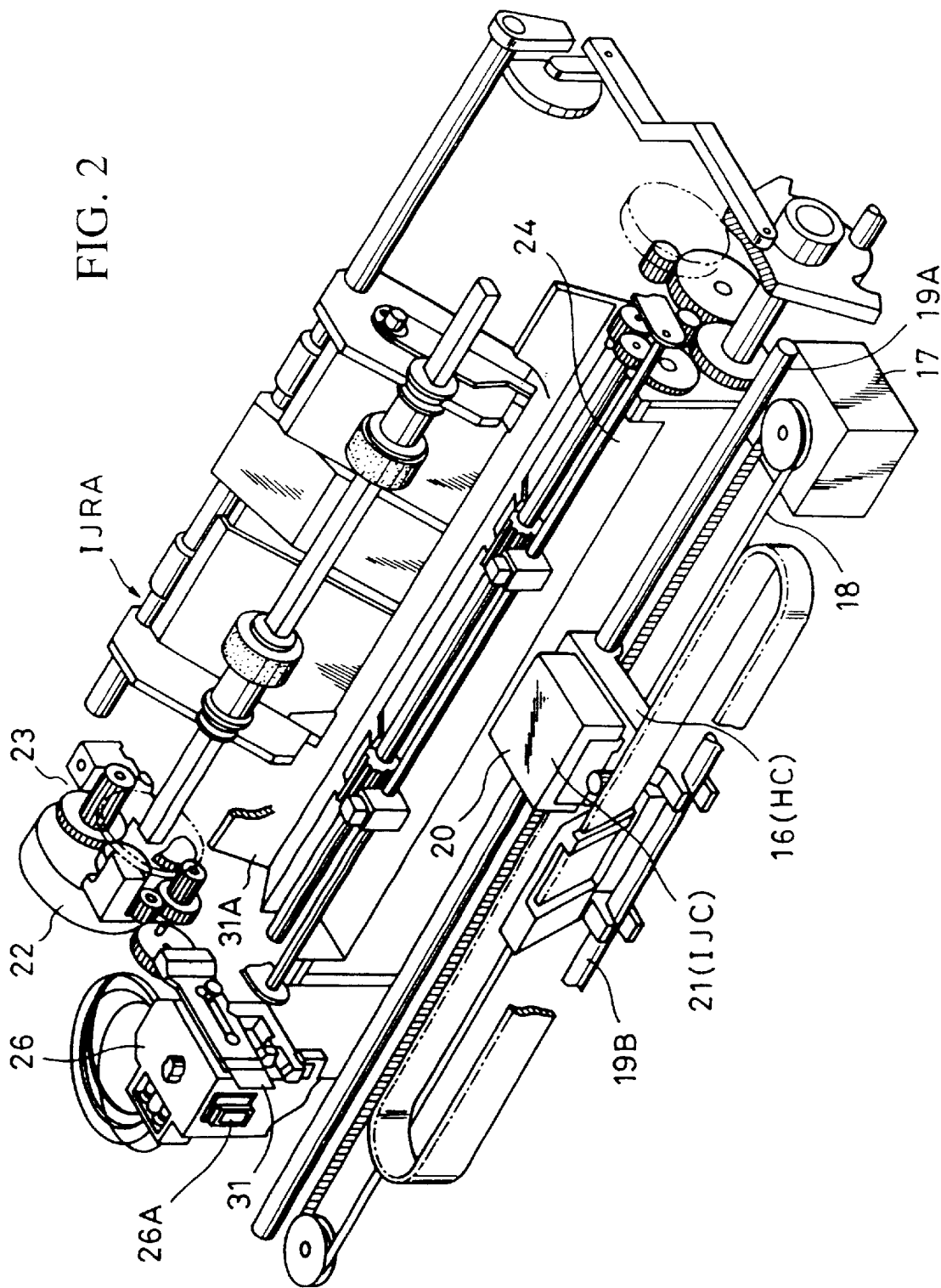
FIG. 2 is a perspective view showing the recording section of an image forming apparatus to which an embodiment of the present invention is applicable.

FIGS. 1 and 2 show an example of the construction of an ink-jet printer suitable for the recording section of an image forming apparatus according to an embodiment of the present invention. In the drawings, symbol IJH indicates an ink-jet head (hereinafter referred to as the "recording head" or simply as the "head") of the type in which ink is emitted onto the recording paper by using a bubble generated by heat energy; symbol IJC indicates a detachable ink cartridge (hereinafter referred to as the "cartridge") formed as an integral unit with the head IJH and equipped with a tank IT for feeding ink to the head; and symbol IJRA (FIG. 2) indicates the body of an ink-jet recording apparatus.

As can be seen from the perspective view of FIG. 1, the cartridge IJC of this embodiment has a configuration in which the front end of the head IJH is slightly protruding from the front surface of the ink tank IT. This cartridge IJC is of a disposable type which is firmly supported by a carriage HC mounted on the ink jet recording apparatus body IJRA to be described below and, at the same time, detachable with respect to the carriage HC.

The ink tank IT for storing ink to be supplied to the head IJH is composed of an ink absorber, a container into which the ink absorber is inserted and a cover member for sealing up the container (none of these three components are shown in the drawings). The ink tank IT is filled with ink, which is successively supplied to the head by ink ejection.

The cartridge IJC, constructed as described above, is detachably mounted, in a predetermined manner, on the carriage HC of the body of the ink-jet recording apparatus to be described below, and, by inputting predetermined recording signals, the relative movement of the carriage HC and the recording medium is controlled so that a desired recording image is formed.

FIG. 2 is an outward perspective view showing an example of the ink-jet recording apparatus equipped with mechanisms for performing the above-mentioned processes.

In the drawing, numeral 20 indicates a recording head of the cartridge IJC having a group of nozzles for ejecting ink onto the recording surface of a recording paper fed onto a platen 24. Numeral 16 indicates a carriage HC for holding the recording head 20. The carriage 16 is connected with a part of a driving belt 18 for transmitting the driving power of a driving motor 17, and is slidable on two guide shafts 19A and 19B arranged parallel to each other, whereby a reciprocating movement of the recording head 20 is possible over the entire width of the recording paper. During this reciprocating movement, the recording head 20 records images corresponding to the received data on the recording paper, which is fed by a predetermined amount at the completion of each main scanning, thereby effecting a sub-scanning.

Numeral 26 indicates a head function recovery device, which is arranged at one end of the movement path of the recording head 20, for example, at a position opposed to the home position. The head function recovery device 26 is operated by the driving force of a motor 22, transmitted through a transmission mechanism 23, thereby effecting a capping operation on the recording head 20. An appropriate suction means (e.g., a suction pump) provided inside the head function recovery device 26 performs an ink sucking operation (a recovery operation through suction of ink) in association with the capping operation of a capping section 26A of the head function recovery device 26 performed on the recording head 20, whereby an ejecting function recovery process is effected by removing the viscous ink remaining in the discharge nozzles. Further, capping is also effected after the completion of each recording operation, etc., thereby protecting the recording head 20. This ejecting function recovery process is conducted when power is turned on, when the recording head is replaced with a new one, when no recording is to be performed for a certain period of time, etc.

Numeral 31 indicates a blade which is arranged on a side surface of the head function recovery device 26 and which constitutes a wiping member formed of silicon rubber. The blade 31 is retained in a cantilever-like fashion by a blade retaining member 31A, and is operated, like the head function recovery device 26, by the motor 22 and the transmission mechanism 23 in such a way as to be engaged with the ejection surface of the recording head 20. This makes it possible for the blade 31 to be engaged with the ejection surface of the recording head 20 with an appropriate timing during a recording operation of the recording head 20 or after an ejecting function recovery process is performed by the head function recovery device 26, thereby removing dew, moisture, dust, etc. from the ejection surface of the recording head 20.

Figure 3:
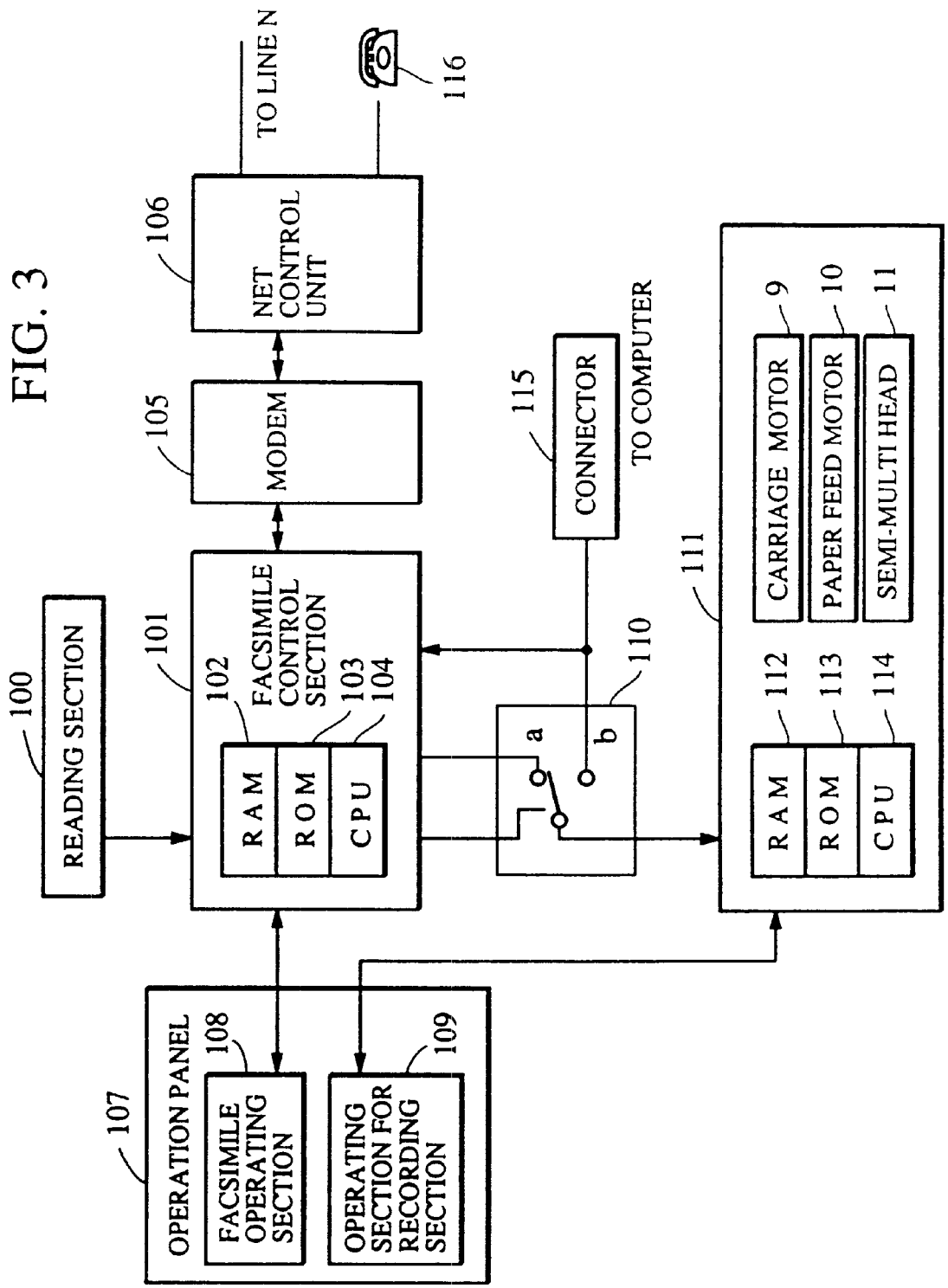
FIG. 3 is a block diagram of the image forming apparatus of this embodiment.

FIG. 3 shows the electrical system configuration of an image forming apparatus according to an embodiment of the present invention. In the drawing, numeral 101 indicates a facsimile control section consisting of a microprocessor, etc. It is composed of a CPU (central processing unit) 104, a ROM (read only memory) 103, a RAM (random access memory) 102 etc., and controls the input and output of images and all of the communication processes. The ROM 103 stores a control program which will be described below. The RAM 102 is used as a work area for the CPU 104 and, further, stores image data buffers, "printing request flags" which will be described below, printing modes, etc.

The input and output of images are effected by a reading section 100 and a recording section 111. That is, the reading of original image data is performed by the reading section 100, which is composed of a CCD (charge-coupled device) sensor, an original feeding system, etc. Received image data and image data read by the reading section 100 at the time of copying are printed on paper by the recording section 111, which includes an ink-jet printer (the recording apparatus IJRA as described with reference to FIGS. 1 and 2).

Connection with a communication line, such as a telephone line, and the input and output of data are effected by a modem 105 and an NCU (net control unit) 106. A telephone 116 for calls and manual control is connected to the NCU 106. In a facsimile receiving operation, image data is input through the NCU 106 and the modem 105 and stored in the RAM 102.

The control means of the recording section 111 includes a CPU 114, a ROM 113 for storing a CPU control program and a character generator, and a RAM 112 used as a work area for the CPU, command buffer and print buffer. This control means controls a carriage motor 9, a paper feed motor 10, and a semi-multi head 11 (corresponding to the head 20 in FIGS. 1 and 2).

The carriage motor 9 is a stepping motor for causing the carriage 16, on which the cartridge 21 (IJC) is mounted, to move in the main scanning direction. The paper feed motor 10, which is also a stepping motor, feeds the recording paper in the sub-scanning direction, which is substantially perpendicular to the main scanning direction, after the completion of each main scanning. The semi-multi head 11 has several tens to several hundreds of nozzles arranged along the sub-scanning direction (64 nozzles in this embodiment, providing a resolution of 360 dpi), and is adapted to record one page of information on the recording paper by performing the main scanning a plurality of times. In the case where information received in facsimile communications is recorded, the data stored in the RAM 102 is transferred by the facsimile control section 101 as raw data (uncoded data) and stored in the RAM 112 in the form of band-like, one-main-scanning data corresponding to the number of nozzles on the semi-multi head 11. This band-like data for each line in the main scanning direction is transferred from the RAM 112 to the semi-multi head 11, thereby effecting recording.

Numeral 110 indicates a switch which is switchable in accordance with the control performed by the facsimile control section 111. When the switch is set to the position a, data received in facsimile communications is transmitted to the recording section 111 for printing. When the switch is set to the position b, printing data from a computer, connected to a connector 115 is transmitted to the recording section 111 to be printed. The facsimile control section 101 transmits not only image data but also commands, which will be described below, to the recording section 111.

The input data from the connector 115 is input to the switch 110 and, at the same time, it is also input to the facsimile control section 101, whereby it is possible for the facsimile control section 101 to detect, when the switch 110 is at the position b, that printing commands, printing data, etc. are being transmitted from the connector 115 to the recording section 111.

Figure 4:
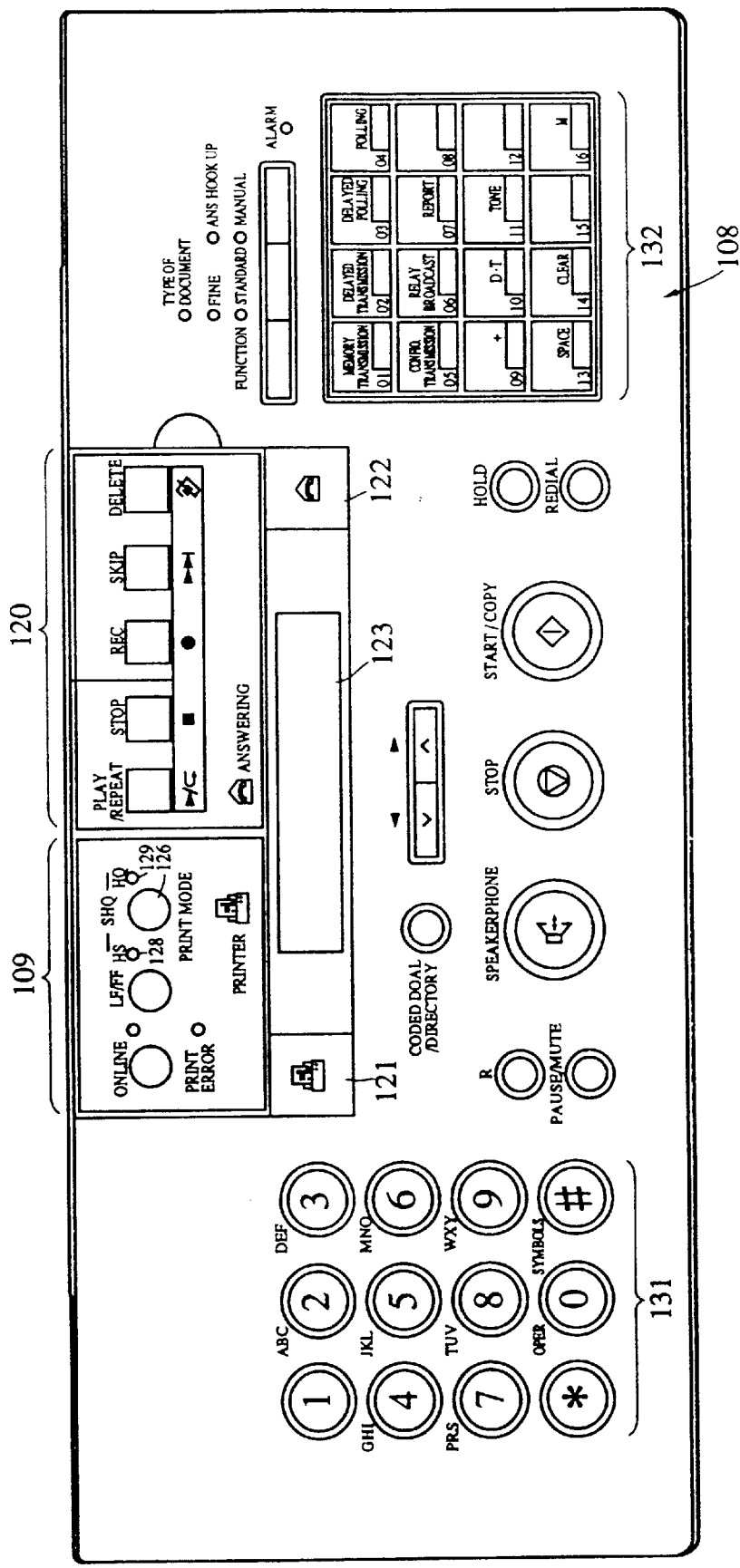
FIG. 4 is a plan view of an operation panel 107 in the image forming apparatus of this embodiment.

FIG. 4 is a plan view of an operation panel 107, which has a facsimile operating section 108 and a printer operating section 109. The facsimile operating section 108 includes ten keys 131 for entering telephone numbers, various function keys 132, a printer key 121 for switching the operation mode between the facsimile and printer modes, and an LCD display 123 for displaying telephone numbers, time of day, etc. The printer operating section 109 includes a printing mode key 126 for enabling the user to designate the printing mode of the recording section 111. The printing mode is changed when the printing mode key 126 is operated at the time that the recording section 111 is in the printer mode. Further, the printer operating section includes displays 128 and 129 for displaying the current printing mode.

The apparatus of this embodiment has an answering machine function. By depressing an answering machine key 122, the apparatus operates as an answering machine.

Further, the operation panel 107 is provided with an answering operation section 120 for realizing the answering machine function. The printer operating section 109 and the answering operation section 120 are provided with a cover (not shown) which can be opened and closed.

In this embodiment, the printing mode can be selected from the following three modes: an SHQ (super high quality) mode (hereinafter referred to as the "one direction printing mode"), an HQ (high quality) mode (hereinafter referred to as the "normal mode"), and an HS (high speed) mode (hereinafter referred to as the "draft") mode. When the printing mode key 126 is depressed, these three printing modes can be changed in a cyclic manner from one to the other to enable the user to select the desired mode.

In the one direction printing mode, the CPU 114 effects a printing operation by moving the carriage 16 in the forward direction only, causing the carriage to return and the recording paper to be fed by one band (line) after each forward movement. By repeating these operations, one page of data is recorded. Due to this arrangement, it is possible to eliminate the deviation in ink ejection points which occurs when the carriage is moved in different directions, thereby making it possible to effect high-quality recording. This one direction printing mode is selected when bit image data transmitted from a host computer is to be printed.

In the normal mode, as mentioned above, the CPU 114 causes the carriage to return after each forward movement of the carriage. However, after the feeding of the recording paper, the CPU 114 performs a printing operation also in the returning direction by reversely transferring band-like data to the head 11. Thus, it controls the recording section so that a recording operation can be performed by the movement of the carriage 16 in either direction. In the draft mode, the CPU 114 transfers data from the RAM 112 to the head 11 after thinning the data out in such a way that any two dots adjacent to each other in the main scanning direction are not printed, and the speed at which the carriage is moved by the carriage motor 9 is increased (that is, the step cycle of the motor is increased). The increase in the recording speed in the draft mode is due to the above-described thinning-out recording contributing to a reduction in the recording period. In an ink-jet type head, it takes a certain amount of time (refill time) before the nozzles are refilled with ink after each ejection for effecting printing.

In this embodiment, it is possible to arbitrarily select one of the above three printing modes when the apparatus is in the printer mode. When in the facsimile mode, the apparatus is forcibly set to the normal printing mode, to perform printing independently of the operating section 109 for operating the recording section.

The operation of the facsimile control section 101 will be described.

Figure 5:
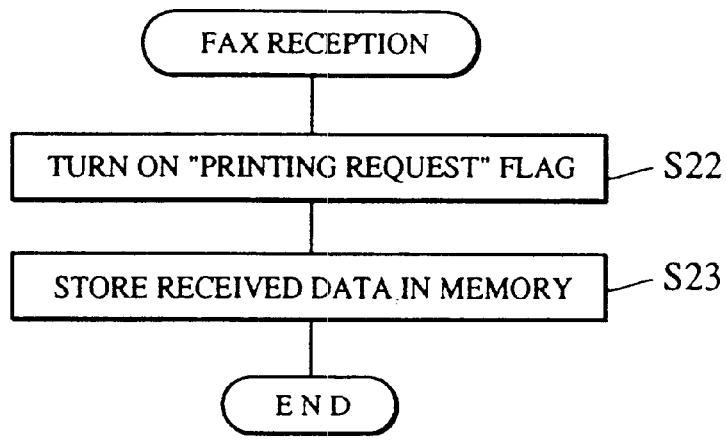
FIG. 5 is a flowchart showing a facsimile reception task operation of the control section 101 in this embodiment.
Figure 6:
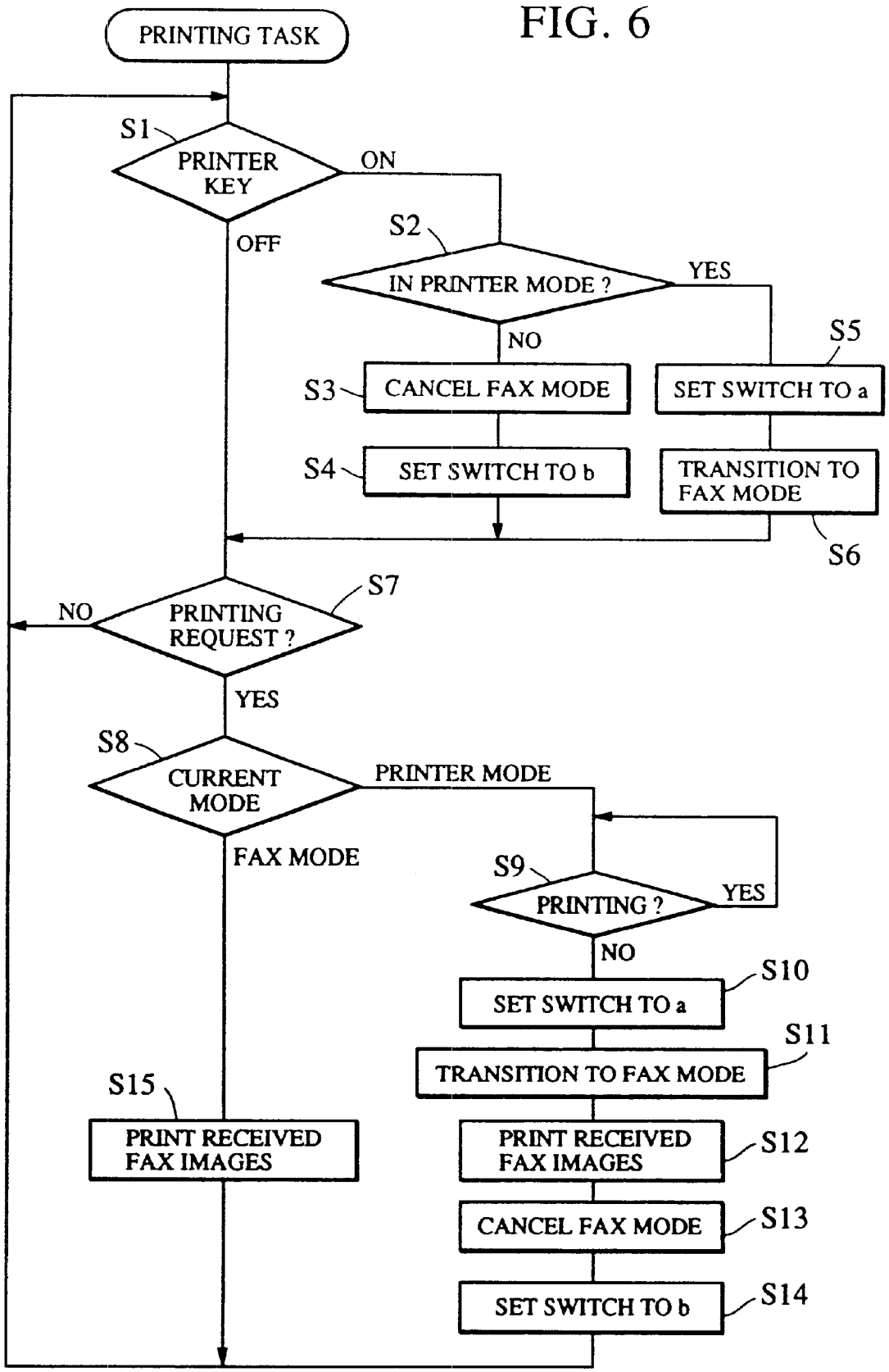
FIG. 6 is a flowchart showing a printing task operation of a control section 101 in this embodiment.

The facsimile control section 101 conducts a multitask operation, executing a reception task as shown in FIG. 5 and a printing task as shown in FIG. 6 on a time sharing basis.

First, the reception task operation of FIG. 5 will be described. When a call signal from the line is detected by the detection circuit of the NCU 106, or when the user designates a receiving operation by manipulating the operation panel 107, the reception task is started, in which the procedure advances to step S22, where the "printing request flag" of the RAM 102, which indicates that received image data exists in the memory, is turned ON, and, in step S23, the received image data is stored in the RAM 102.

Next, the printing task operation of FIG. 6 will be described. The printing task is constantly in operation to monitor the state of the printer key. Further, when the "printing request flag" is turned ON, it starts printing.

Specifically, a judgment is made in step S1 as to whether the printer key has been depressed. If the key is found to have been depressed, the procedure advances to step S2 to effect operation mode switching (between the facsimile and printer modes) of the recording section 111. In step S2, the current operation mode is checked. If the current operation mode is the printer mode, the procedure advances to step S5, where the switch 110 is switched to the position a so that the commands from the facsimile control section 101 can be transmitted to the recording section 111. Subsequently, in step S6, a command for transition to the facsimile mode is transmitted to the recording section 111. After that, the recording section 111 operates as the recording section of the facsimile apparatus.

If, in step S2, the current operation mode is found to be the facsimile mode, the procedure advances to step S3, where a command for cancelling the facsimile mode is transmitted to the recording section 111. Then, in step S4, the switch 110 is switched to the position b. After that, the printing commands from the computer, which is connected to the connector 115, are transmitted to the recording section 111, which then operates as a printer.

Next, in step S7, the "printing request flag" in the RAM 102 is checked. When there is no printing request (i.e., when the flag is OFF), the procedure returns to step S1. If there is a printing request, the procedure advances to step S8, where the current operation mode is checked. If the current operation mode is found to be the facsimile mode, the received image data in the RAM 102 is sent, in step S15, to the recording section 111, whereby the received images are printed, and then the procedure returns to step S1.

When, in step S8, the current operation mode is found to be the printer mode, it is checked, in step S9, whether any data is being sent from the connector 115 to the recording section 111. If data is being sent to the recording section, it is judged that printing is being performed, and step S8 is looped. It no printing is being performed, the procedure advances to step S10, where the switch 110 is switched to the position a. Subsequently, in step S11, a command for transition to the facsimile mode is sent to the recording section 111. Next, in step S12, images received in facsimile communications are printed, as in step S15. In step S13, a command for cancelling the facsimile mode is sent to the recording section 111. In step S14, the switch 110 is returned to the position b. During the operations of steps S10 through S14, a "busy" signal is supplied to the host computer. In steps S13 and S14, the recording section 111 is restored to the printer mode, and the procedure returns to step S1 to repeat the above operations.

Figure 7:
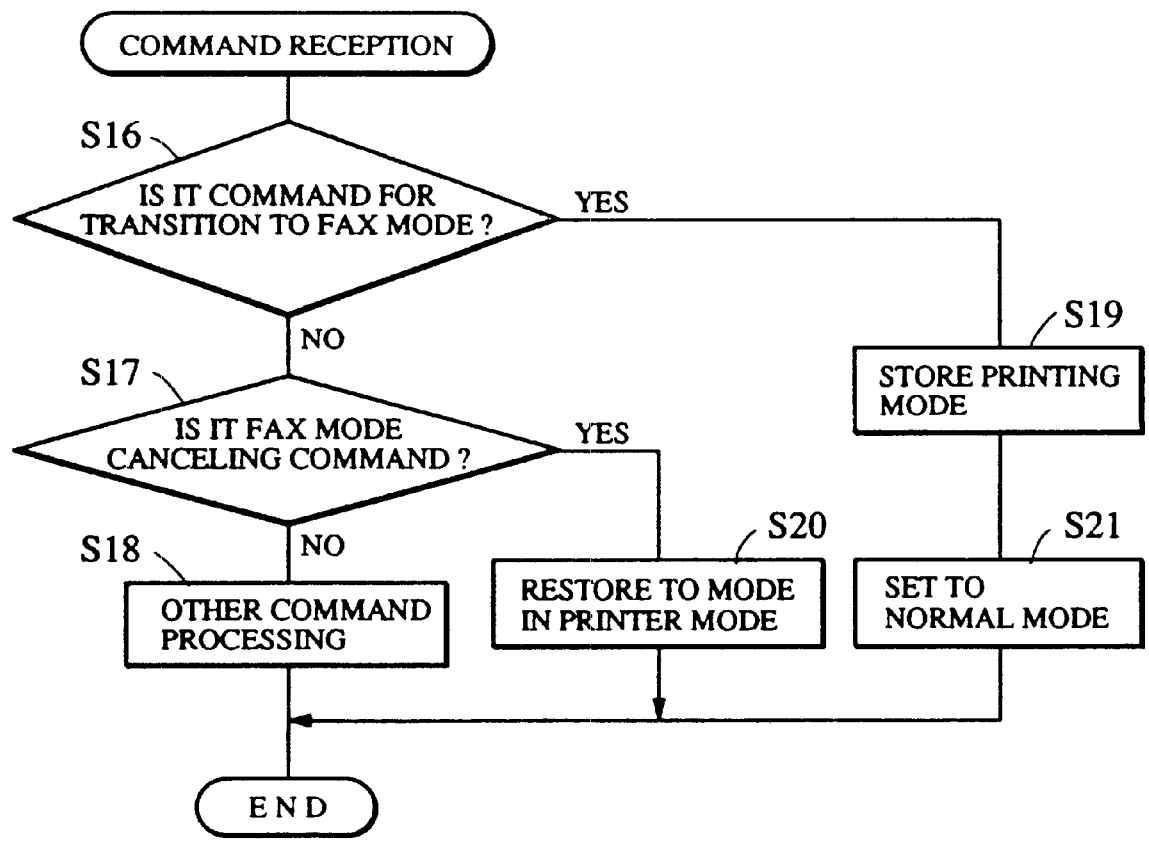
FIG. 7 is a flowchart showing a recording operation of the control section in this embodiment.

FIG. 7 is an operation flowchart for the recording section 111.

When a command is transmitted from the facsimile control section 101 by way of the switch 110, the control procedure for the recording section 111 advances to step S16. If, in step S16, the command transmitted is a command for transition to the facsimile mode, the procedure advances to step S19, where the printing mode which has been used in the printer mode up to the present is stored in the RAM 112. Then, in step S21, the printing mode is set to the normal mode for reciprocative printing, thereby commanding the command receiving operation. If, in step S16, the command transmitted is not a mode for transition to the facsimile mode, the procedure advances to step S17, where it is checked whether the command is a facsimile mode cancelling command. If the command is found to be a facsimile mode cancelling command, the procedure advances to step S20, where the printing mode which has been used in the printer mode until the transition to the facsimile mode is read from the RAM 112 to set, for example, the one-direction printing mode, thereby completing the setting operation. If, in step S17, the command transmitted is not a command for cancelling the facsimile mode, the procedure advances to step S18, where processes for other commands are executed to end the operation.

As described above, with the present apparatus, it is possible to perform printing in a printing mode that is most suitable for the operation mode (which is either the printer mode or the facsimile mode) of the recording section. That is, when the apparatus is used as a printer, the user can select a desired printing mode from three printing modes, a high-quality mode, normal mode, and draft mode, and high quality printing of image data can be effected by one direction printing (the high-quality mode). When the apparatus is used in the facsimile mode (i.e., as a facsimile apparatus), the printing mode is set to the normal mode, thereby enabling images received in facsimile communications to be printed at a higher speed without causing any extreme deterioration in image quality.

If the user leaves the apparatus in the printer mode, images received in facsimile communications are printed in the normal mode. Since the switching of the operation mode and the printing of images received in facsimile communications are effected in the same task, there is no possibility of the operation mode being switched to the printer mode daring a facsimile receiving operation. Since the printing modes for the recording section are stored in the RAM of the recording section, it is only necessary for the interface between the facsimile control section and the recording section to be in one direction, thereby simplifying the construction of the switch 110.

While in the above-described embodiment the key 121 for manually setting the operation mode is provided, it is also possible for the operation mode to be set by a command from the host computer in addition to or instead of being set by the key 121. When the key 121 is not provided, steps S1 through S6, S8 and S15 in the flowchart of FIG. 6 are omitted, and the procedure advances to step S9 when the result of step S7 is "YES".

Further, while in the above embodiment, any facsimile image data received while the apparatus is in the printer mode, which was manually set by the key 121, is printed after the completion of the printing which has been conducted in the printer mode, this should not be construed restrictively. It is also possible for the received image data to be stored in the RAM 102 so that it can be printed out in response to the setting of the facsimile mode by the key 121.

It is also possible for the facsimile control section to control the recording section. That is, the operation of the recording section of FIG. 6 can also be executed as one of the tasks of the facsimile control section.

While in the above-described embodiment there are two separate control sections, the main control section for controlling the transmission and reception of data and the operation display section, and the recording control section for controlling recording operations, it is also possible for the main control section to be designed so as to be capable of controlling all operations including the recording operations.

The above embodiment has been described with reference to the case where it is applied to an ink-jet recording system in which recording is performed by ejecting ink droplets formed by utilizing heat energy. Examples of the typical construction and the basic principle of this type of ink-jet recording system, which it is desirable to adopt, are disclosed in U.S. Pat. Nos. 4,723,129 and 4,740,796.This ink-jet recording system is applicable to both so-called on-demand-type and continuous type recording apparatuses. In particular, this ink-jet recording system can be advantageously applied to the on-demand type recording apparatus, in which at least one driving signal causing a rapid rise in temperature beyond a boiling point in accordance with the information to be recorded, is applied to electrothermal conversion members arranged in correspondence with a sheet retaining liquid (ink) or with a liquid path. As a result, heat energy is generated in the electrothermal conversion members to cause film boiling on the heat action surface of the recording head, so that a bubble which is in one-to-one correspondence with this driving signal can be formed in the liquid (ink). By the growth and shrinkage of this bubble, the liquid (ink) is ejected through a discharge nozzle to form at least one droplet. It is more desirable for this driving signal to be provided in a pulse form since the the growth or shrinkage of the bubble can then be effected instantaneously and appropriately, thereby realizing a liquid (ink) ejection having particularly excellent responsiveness.

Preferable examples of this pulse-form driving signal are described in U.S. Pat. Nos. 4,463,359 and 4,345,262. By adopting the conditions given in the specification of U.S. Pat. No. 4,313,124, which relates to the temperature rise ratio on the above heat action surface of the recording head, a recording which is even more excellent is made possible.

Apart from the recording head constructions as described in the above-mentioned specifications, in which discharge nozzles, liquid paths and electrothermal conversion members are combined (to form linear or rectangular flow paths), it is also possible to adopt a construction in which the heat action is provided in bent areas, as disclosed in the specifications of U.S. Pat. Nos. 4,558,333 and 4,459,600.

Further, it is also possible to adopt the construction as disclosed in Japanese Patent Laid-Open No. 59-123670, according to which a common slot is used as the discharge section for a plurality of electrothermal conversion members, or the construction as disclosed in Japanese Patent Laid-Open No. 59-138461, according to which openings for absorbing the pressure waves of heat energy are arranged in correspondence with the discharge section.

Further, a full-line type recording head having a length corresponding to the width of the largest recording medium that can be used in the associated recording apparatus can be formed by combining a plurality of recording heads so as to satisfy the length requirement therefor, as disclosed in the specifications mentioned above. Alternatively, such a full-line type recording head can be formed as a single recording head in the form of an integral unit.

Further, the present invention can be effectively applied to a replaceable-chip-type recording head, which is attached to the associated recording apparatus body so as to be electrically connected thereto and supplied with ink therefrom. Further, the present invention can also be effectively applied to a cartridge-type recording head, which is integrally provided with an ink tank.

Also, provision of a function recovery means for the recording head, a preliminary auxiliary means, etc. is desirable since this will further stabilize the effects of the present invention. Specifically, it is effective, from the viewpoint of stable recording, to provide the recording head with a capping means, cleaning means, pressurizing or suction means, electrothermal conversion members or separate preliminary heating means consisting of heating elements, or a combination thereof, and a mode for preliminary ejection performed apart from the ejection for recording.

While the present invention has been described as applied to the case where a liquid ink is used, this should not be construed restrictively. It is also possible to use an ink of the type which is in a solid form at room temperature or under and which softens or liquefies at room temperature. In the ink-jet type recording system described above, temperature control is generally effected by keeping the ink within the temperature range of 30° C. to 70° C. so as to maintain the ink viscosity in a stable ejection range. Accordingly, any type of ink will do as long as it is in a liquid form in the above temperature range, in which recording signals are imparted to the recording means.

It is also possible to prevent temperature rise due to the heat energy for bubble generation by positively utilizing this heat energy to change the ink from the solid to the liquid state. Further, it is possible to use an ink of the type which solidifies when left to stand so that evaporation of the ink can be avoided. In any case, the ink should liquefy when heat energy is imparted thereto in accordance with recording signals so that it can be ejected as liquid ink. Further, the ink used may be of such a type which does not liquify until heat energy is imparted thereto and which instantly starts to solidify upon reaching the recording medium. Such a type of ink may be retained in the form of a liquid or solid in recesses of a porous sheet or in through-holes in such a way as to be opposed to the electrothermal conversion members, as described in Japanese Patent Laid-Open Nos. 54-56847 and 60-71260. The above-described types of ink can be most effectively applied to an apparatus of the system utilizing film boiling as mentioned above.

Further, the present invention is not restricted to the ink-jet system utilizing heat energy, but is also applicable to the ink-jet system utilizing piezoelectric elements, etc.

The present invention is not restricted to the above-described embodiments, but allows various modifications without departing from the scope of the appended claims.

What is claimed is:

1. An image forming apparatus that forms an image based on data received from a plurality of data sources of different kinds, including a data source of a first kind, said apparatus comprising:

a receiver for receiving data from each of the plurality of data sources, said receiver normally being enabled to receive data from each kind of data source;

a memory for storing data received by said receiver;

a recording unit, in which one of a plurality of printing modes is set, for forming an image based on data read from said memory;

a determination unit, responsive to a print request received from one of the plurality of data sources, for determining whether or not image formation by said recording unit is currently being performed, based on data previously received from another one of the plurality of data sources, said receiver being enabled, in response to a determination by said determination unit that image formation is currently being performed, to receive data from the first kind of data source and to refuse receipt of data from a data source of another kind; and an output unit, responsive to a determination by said determination unit that image formation is not currently being performed and to receipt and storage of data from the one data source in said memory, for generating a command for setting said recording unit in a specific one of the plurality of printing modes, wherein any of the plurality of printing modes can be set as a specific printing mode in accordance with the command generated by said output unit.

2. An apparatus according to claim 1, wherein image formation by said recording unit based on data from the other data source can be performed in the specific printing mode.

3. An apparatus according to claim 1, wherein said recording unit records images on a recording medium by ejecting ink droplets through discharge nozzles by utilizing an ejection energy generated in accordance with image data to be recorded.

4. An apparatus according to claim 3, wherein said recording unit ejects ink droplets by causing changes in a condition of ink using heat energy.

5. An apparatus according to claim 4, wherein said recording unit includes:

a recording head equipped with a plurality of recording elements; and a moving unit for performing a main scanning by a reciprocative movement of the recording head relative to the recording medium.

6. A recording control apparatus for controlling a recording unit that can be set in any of a plurality of printing modes, said apparatus being able to receive data from a plurality of data sources of different kinds, including a data source of a first kind, said apparatus comprising:

a receiver for receiving data from each of the plurality of data sources, said receiver normally being enabled to receive data from each kind of data source;

a memory for storing data received by said receiver;

a determination unit, responsive to a print request received from one of the plurality of data sources, for determining whether or not image formation by the recording unit is currently being performed, based on data previously received from another one of the plurality of data sources, said receiver being enabled, in response to a determination by said determination unit that image formation is currently being performed, to receive data from the first kind of data source and to refuse receipt of data from a data source of another kind; and an output unit, responsive to a determination by said determination unit that image formation is not currently being performed and to receipt and storage of data from the one data source in said memory, for generating a command for setting the recording unit in a specific one of the plurality of printing modes, wherein any of the plurality of printing modes can be set as the specific printing mode in accordance with the command generated by said output unit.

7. An apparatus according to claim 6, wherein image formation by the recording unit based on data from the other data source can be performed in the specific printing mode.

8. An apparatus according to claim 6, wherein the recording unit records images on a recording medium by ejecting ink droplets through discharge nozzles by utilizing an ejection energy generated in accordance with image data to be recorded.

9. An apparatus according to claim 8, wherein the recording unit ejects ink droplets by causing changes in a condition of ink using heat energy.

10. An apparatus according to claim 9, wherein the recording unit includes:
   a recording head equipped with a plurality of recording elements; and
   a moving unit for performing a main scanning by a reciprocative movement of the recording head relative to the recording medium.

\* \* \* \* \*

UNITED STATES PATENT AND TRADEMARK OFFICE
CERTIFICATE OF CORRECTION

PATENT NO. : 6,342,949 B1      Page 1 of 1
DATED : January 29, 2002
INVENTOR(S) : Hisao Terajima It is certified that error appears in the above-identified patent and that said Letters Patent is hereby corrected as shown below:

<u>Title page,</u>
Item [56], References Cited, U.S. PATENT DOCUMENTS,
Insert -- 5,021,892 06/04/91 Kita et al. .....348/468 --.
Insert -- 5,200,830 04/06/93 Imoizumi et al. ..... 358/296 --.
Insert -- 5,373,368 12/13/94 Taniguro ......358/296 --.
FOREIGN PATENT DOCUMENTS
Insert: -- EP  0-291777 11/23/88 ...... G03G/H04N --.
"5456847" should read -- 54-56847 --.
"5-9123670" should read -- 59-123670 --.
"5-9138461" should read -- 59-138461 --.
"6071260" should read -- 60-71260 --.
OTHER PUBLICATIONS, insert: -- Patent Abstracts of Japan, vol. 16, no. 370 (M-1292) August 10, 1992 & JP-A-04 118 266 (Canon Inc.) [Abstract] --.

<u>Column 7,</u>
Line 42, ""draft")mode." should read -- "draft" mode). --.

<u>Column 9,</u>
Line 4, "It" should read -- If --.
Line 62, "daring" should read -- during --.

Signed and Sealed this

Ninth Day of July, 2002

Attest:

Attesting Officer

JAMES E. ROGAN
*Director of the United States Patent and Trademark Office*